2,870,104

CHLOROPRENE RUBBER COMPOSITION CONTAINING A TALL OIL-SULPHUR REACTION PRODUCT

Eric O. Ridgway, Scotch Plains, N. J., assignor to Ridbo Laboratories, Inc., Trenton, N. J., a corporation of New Jersey No Drawing. Application July 31, 1953
Serial No. 371,787

5 Claims. (Cl. 260—23.7)

This invention relates to a method of compounding certain synthetic rubber formulations and to certain cured and uncured synthetic rubber compositions, particularly those compositions containing polymerized chloroprenes.

The chloroprene base rubbers have certain unique properties which render them particularly desirable for a wide variety of purposes, as for example resistance to oxidation and chemical attack. The chloroprenes are also characterized by certain properties which render the rubbers difficult to compound, work or process; therefore, their best qualities cannot always be utilized effectively.

In explanation of some of the problems in connection with the compounding, processing, and curing of these polymers, it is mentioned generally that it is usually desirable to mix the raw chloroprene with various ingredients, including fillers, pigments, plasticizers, anti-oxidants and the like, so as to prepare a composition which, when cured, will have the properties desired. After mixing or compounding, the composition is then further processed or worked to a desired condition, shape or form, for instance by calendering, extrusion, molding or the like. The thus shaped composition is then cured, usually by application of heat. While many natural and synthetic rubbers require, for purposes of curing, the addition of a vulcanizing agent, usually sulfur, chloroprene rubber formulations are ordinarily curable without sulfur. However, certain metallic oxides are used as curing agents.

One characteristic of the chloroprenes is their tendency to "scorch" during working, i. e., to commence curing prior to the completion of the processing. This, of course, is undesirable. In many instances "scorching" results in impairment of the batch, and such scorched batches frequently have to be discarded.

Another characteristic of the chloroprene elastomers of this general type is the tendency to soften undesirably during the mixing operation. This makes it difficult to incorporate and thoroughly disperse the various compounding ingredients therein, and, with certain types of formulations particularly, a batch is sometimes spoiled or "scorched" even before the compounding is completed.

Efforts have been made to overcome these problems, for instance by employing softeners, peptizers and plasticizers. While some of these ingredients do tend to improve the processability of the chloroprene type rubbers in general, they also tend to impair the physical qualities of the ultimately cured products, and generally they do not contribute any particularly desirable characteristics to the finished vulcanizates.

One of the principal objects of the present invention is to provide a chloroprene rubber formulation or composition with which various other materials or additives can readily be mixed and in which such additives can be effectively dispersed; while at the same time providing a composition which is much less subject to scorching during subsequent working or processing than are prior known formulations.

These results are achieved according to the invention by incorporating in the chloroprene rubber an agent which reduces the characteristic scorchiness of this kind of rubber, and which inhibits the tendency to develop low viscosity during milling. This agent can also be employed in such quantities as to extend many formulations of known types. Moreover, when the agent is employed according to the present invention it not only accomplishes these objects without impairing the desirable properties of the chloroprenes but still further in many instances, it will result in advantageous changes in properties of both the cured and the uncured chloroprene which will permit an even wider range of uses and greater flexibility in processing.

The agent to be employed according to the invention, comprises the reaction product of tall oil and sulfur, prepared in the manner more fully described hereinafter.

In many formulations incorporating the tall oil-sulfur reaction product, according to the invention, it is found that the cured compound has increased hardness, tensile strength, and tear resistance, as compared with similar formulations not incorporating the tall oil-sulfur reaction product.

Further, in cases where a batch of chloroprene-type rubber has become apparently scorched during compounding or subsequent processing, the tall oil-sulfur reaction product may be worked into the rubber and the batch thereby salvaged.

In connection with the formulations herein contemplated, it is first mentioned that the chloroprene rubbers are of a variety of types. Some of the chloroprenes have relatively normal viscosities, at least when compared with those chloroprenes which have such exceedingly high viscosities that it is almost impossible to employ the ordinary compounding procedures or use ordinary compounding equipment.

The invention is particularly concerned with compositions containing those chloroprene rubbers which have a relatively normal viscosity, that is, a viscosity in the range which permits them to be compounded and worked according to the usual techniques. These chloroprenes also have a tendency to develop an undesirably low viscosity during milling. Among the chloroprenes which fall into this category are certain of the polymers of 2-chlorobutadiene 1,3 which are known to the trade as Neoprene GN, and Neoprene W (made by E. I. du Pont de Nemours and Company). Other "neoprenes" (also made by du Pont) as for example Types AC, CG, E, FR, GN-A, KNR, RT, Q, WRT, and GRT, which are also basically chloroprene rubbers can also be employed in this invention.

In general the polymerized chloroprenes to which the invention is applicable may also be identified as those polymers having a viscosity in the range which can be measured by the Mooney method; and the invention is especially useful with those polymers having a viscosity in the upper portion of the measurable range referred.

There are a number of known methods for determining the viscosity of elastomeric materials such as the chloroprenes, but the values obtained by various of these methods are not always in complete agreement. It is a well recognized technique to measure the viscosity of certain rubbers according to the Mooney method, using a machine having a driven rotor. In the Mooney method, viscosity determinations are made in the testing machine with either a relatively large diameter rotor or a relatively small diameter rotor. The small rotor ordinarily is used only on those rubbers which have exceptionally high viscosities. However, completely consistent determinations are not always obtained even on the same rubber when employing rotors of different size.

In general, those chloroprene rubbers having a viscosity which can be measured by the Mooney method are also characterized by capability of being extended with light petroleum fractions. This characteristic also goes to further identify the chloroprenes which can be used in accordance with this invention.

Chloroprene rubbers having still higher viscosities which either cannot be accurately measured or can only be measured with great difficulty by the Mooney method and which are not capable of being extended with light petroleum fractions are also known. These chloroprenes do not soften during processing. An example of this type of chloroprene is the polymer known in the trade as Neoprene S (made by E. I. du Pont de Nemours and Company), and therefore the present invention is not concerned therewith.

The tall oil-sulfur reaction product contemplated for use according to the invention is prepared as follows:

First note that tall oil, which is a by-product of the manufacture of paper, comprises a mixture of fatty acids and rosin acids in roughly equal proportions, together with from about 3% to about 15% of unsaponifiables, including sterols, hydrocarbons, etc. The tall oil employed may be the crude by-product or may be a refined product, the latter being advantageous where white or light shades of colors are desired in the final vulcanized rubber or rubber product being produced.

The tall oil is heated together with from about 1% to 25% of sulfur, most advantageously from about 6% to 10%, the temperature of heating being between about 300° F. and 400° F., preferably in the neighborhood of 310° F. to 330° F. The time of heating should be continued until no free sulfur remains.

The desirable characteristics of the sulfurized product are apparently due to the content of fatty acids and rosin acids in the material employed for sulfurization. Therefore, it is advantageous in the heating of the tall oil with the sulfur to avoid severe time-temperature relationships (especially excessively high temperatures), because such severe treatment tends to decarboxylate rosin acids present and excessively increase the hydrocarbon or unsaponifiable content.

The sulfurized tall oil product comprises a homogeneous, highly viscous mass at room temperatures; and it is of a sticky consistency having a high affinity for rubbers of the kinds enumerated, and is almost completely compatible with such rubbers in any proportions.

A tall oil-sulfur reaction product prepared as described above will be substantially sulfur-free and this is of importance in formulations according to the present invention because of the sensitivity of the chloroprene-type rubbers with respect to curing. This sensitivity is aggravated by the presence of free sulfur.

The quantity of the tall oil sulfur-reaction product to be used will vary somewhat according to the particular formulation being prepared and the properties desired in a particular batch, or in the uncured compound, or in the ultimately cured products, but in general quantities ranging from 2 or 3% up to about 25%, calculated by weight on the basis of the chloroprene rubber present, are usable. For most purposes a range from about 5% to about 12% gives good results.

While individual formulations may contain any one or more of a wide variety of a number of other ingredients, such as carbon black, plasticizers, pigments, etc., any of such formulations preferably include, in addition to the rubber and the tall oil-sulfur reaction product, from about 3 to 8% of extra light calcined magnesia and from about 4 to 10% zinc oxide. These serve as curing agents and are regularly used in chloroprene-type rubber formulations of the kind here involved. Antioxidants are also most usually included, for instance in a percentage range from about 1 to 5%. The percentages of magnesia, zinc oxide and antioxidant just mentioned are given on the basis of percent by weight of the chloroprene present.

The mixing of the chloroprene and the sulfurized tall oil reaction product can be carried out according to the usual techniques employed in the rubber art for admixing the rubber stock and viscous liquids, and the equipment can be that normally used for such purposes. The sulfurized tall oil can be introduced into a batch at any time during the compounding operations. However, it is to be pointed out that by following the procedure set forth in the copending application Serial No. 371,792, especially beneficial results are often secured by introducing the sulfurized tall oil reaction product into the chloroprene first or early in the compounding operation.

One advantageous way of practicing the present invention is to prepare a master batch of the chloroprene rubber containing the sulfurized tall oil and one or more of the other additives to be incorporated, excepting, however, the zinc oxide (which as above noted is preferably also used in the ultimate formulation). The master batch, or a portion thereof, is then mixed with whatever other rubber is to be incorporated in the ultimate composition, and then the zinc oxide is worked into the mixture. Since the zinc oxide acts as a curing agent, proceeding in this way further tends to minimize scorchiness.

EXAMPLES

There are presented herebelow a number of examples, most of which are given in comparative pairs or groups, so as to illustrate various of the features and advantages hereinabove discussed.

To simplify the presentation of the examples and to enable tabulation of the data, there is given just below a statement fully identifying treatment conditions, testing results, and materials used in the examples and referred to therein only briefly or by identifying letters or figures for the sake of simplicity.

Considering first the materials used in the examples, note the following:

STO—wherever this symbol appears in the examples sulfurized tall oil is meant. In all of the examples, except Examples 8 and 9, the sulfurized tall oil was prepared in the following manner: Crude tall oil was heated at a temperature of about 320° F. with 10% of sulfur for about 3–4 hours. In Examples 8 and 9, the tall oil was reacted with 8% and 6% of sulfur respectively.

The rubbers used in various of the examples are identified as follows:

Neoprene Type GN—a chloroprene polymer (stabilized with thiuram disulfide). Ml 4 viscosity at time of manufacture 54 to 75. Made by E. I. du Pont de Nemours & Co.

Neoprene Type W—a chloroprene polymer (substantially free of sulfur or substances capable of accelerating vulcanization). ML 4 viscosity 47±5. Made by E. I. du Pont de Nemours & Co.

The plasticizers and softeners used in the examples may be identified as follows:

Carbonex S. Plastic—solid coal-tar hydrocarbons modified by the addition of small amounts of fatty acid. Made by the Barrett Division of the Allied Chemical & Dye Corp.

Plasticizer SC—glycol ester of vegetable oil fatty acid. Made by E. F. Drew & Co., Inc.

Circo light oil—a petroleum oil fraction made by the Sun Oil Co.

Furatone 1444—Cashew nut-furfuraldehyde condensation resin. Made by the Irvington Varnish Company, Inc.

Petrolatum—petroleum jelly.

Neophax A—vulcanized vegetable oil; made by the Stamford Rubber Supply Co.

Cumar CX—polymers of indene, cumarone, and associated coal tar compounds. Made by the Barrett Division of the Allied Chemical & Dye Corp.

The pigments used in the examples may be identified as follows:

EPC—easy processing channel carbon black.
MT—medium thermal carbon black.
Barytes—barium sulfate.
Extra light calcined magnesia—made by General Magnesite & Magnesia Corp.
Whiting—calcium carbonate made by Georgia Marble Co. and sold under trade name of Gamaco Whiting.

Antioxidants used in the examples may be identified as follows:

Neozone A—phenyl-alpha-naphthylamine; made by E. I. du Pont de Nemours Co.
Heliozone—selected mixture of waxy materials made by E. I. du Pont de Nemours Co.

Accelerators used in the examples may be identified as follows:

NA–22—2-mercaptoimidazoline; made by E. I. du Pont de Nemours Co.
Altax—benzothiazyl disulfide.
Permalux—diortho-tolylguanidine salt of dicatechol borate; made by E. I. du Pont de Nemours Co.
Thermoflex A—25% di-p-methoxy diphenylamine, 25% diphenyl-p-phenylenediamine and 50% phenyl-beta-naphthylamine.

Conditions of treatment, test results, etc., are identified as follows:

Wherever cures are mentioned, they represent vulcanization treatments at the times indicated in minutes at a temperature of about 290° F.

All modulus and tensile figures are given in pounds per square inch.

All hardness figures are determined on the Shore A scale.

All crescent tear figures are given in pounds to break, by tearing, a crescent shaped test sample which has been nicked to initiate the tear.

All resilience tests indicate percent of rebound using the Bashore resiliometer.

The Mooney viscosity figures are identified in the examples as "MS" or "ML" according to whether the determination is made with a small or large rotor, respectively. In all instances the determinations were made at 212° F. The time in minutes of the Mooney viscosity test is indicated by the numeral following the letters "ML" or "MS."

The Mooney scorch figures given in the example represent time in minutes from the beginning of the test to raise the viscosity 5 points above its lowest level during the test. In all cases these determinations were made at 250° F.

In all of the examples the parts indicated are parts by weight.

*Examples 1 and 2*

The basic formula used in these examples was as follows:

| | Parts |
|---|---|
| Neoprene Type GN | 80 |
| Neoprene Type W | 20 |
| Light processing oil | 5 |
| Cottonseed fatty acids | 5 |
| Extra light calcined magnesia | 6 |
| Heliozone | 3 |
| Neozone A | 2 |
| Stearic acid | 2 |
| EPC | 50 |
| Barytes | 30 |
| NA 22 | .5 |
| Zinc oxide | 5 |
| Total | 208.5 |

The formulation as such was used for Example 1. To the above formulation was added, along with the softeners, 10 parts of sulfurized tall oil, for Example 2.

HARDNESS

| Cures (minutes) | 1 | 2 |
|---|---|---|
| 15 | 73 | 77 |
| 30 | 75 | 78 |
| 45 | 75 | 80 |
| 60 | 75 | 80 |

MODULUS AT 200%

| | | |
|---|---|---|
| 15 | 1,025 | 700 |
| 30 | 1,340 | 860 |
| 45 | 1,450 | 940 |
| 60 | 1,540 | 1,000 |

MODULUS AT 400%

| | | |
|---|---|---|
| 15 | | |
| 30 | 2,475 | 1,575 |
| 45 | | 2,000 |
| 60 | | 2,250 |
| | | 2,360 |

TENSILE STRENGTH

| | | |
|---|---|---|
| 15 | 2,750 | 2,200 |
| 30 | 2,900 | 2,360 |
| 45 | 3,075 | 2,560 |
| 60 | 3,100 | 2,600 |

PERCENT ELONGATION

| | | |
|---|---|---|
| 15 | 470 | 600 |
| 30 | 370 | 500 |
| 45 | 360 | 480 |
| 60 | 350 | 450 |

CRESCENT TEAR

| | | |
|---|---|---|
| 15 | | |
| 30 | 446 | 433 |
| 45 | 275 | 460 |
| | 320 | 500 |
| Viscosity ML 4 | 56 | 30 |
| Mooney Scorch MS | 5.4 | 9 |

The above test results illustrate that, in spite of the compound being extended by 10 parts of sulfurized tall oil, the Shore hardness and tear resistance have been considerably increased.

Most worthy of note is the considerable improvement in Mooney scorch, which means that Example #1 would be very difficult to process, while Example 2 is what is considered to be a safe stock.

*Examples 3 and 4*

| Formula | 3 | 4 |
|---|---|---|
| | Parts | Parts |
| Neoprene Type GN | 75 | 75 |
| Neoprene Type W | 25 | 25 |
| Carbonex S Plastic | 5 | 5 |
| Cottonseed Fatty Acids | 5 | 5 |
| Extra Light Calcined Magnesia | 6 | 6 |
| Neozone A | 1 | 1 |
| Stearic Acid | 2 | 2 |
| Paraffin | 1 | 1 |
| EPC | 60 | 60 |
| Barytes | 50 | 50 |
| Permalux | .25 | .25 |
| Zinc Oxide | 4 | 4 |
| Plasticizer SC | 10 | |
| STO | | 10 |
| Total | 244.25 | 244.25 |

Examples 3 and 4—Continued

SHORE HARDNESS

| Cures (minutes) | 3 | 4 |
|---|---|---|
| 15 | 68 | 86 |
| 30 | 71 | 90 |
| 45 | 75 | 90 |
| 60 | 75 | 90 |

MODULUS AT 200%

| | 3 | 4 |
|---|---|---|
| 15 | 430 | 1,075 |
| 30 | 800 | 1,360 |
| 45 | 1,200 | 1,450 |
| 60 | 1,300 | 1,600 |

MODULUS AT 400%

| | 3 | 4 |
|---|---|---|
| 15 | 1,060 | 1,825 |
| 30 | 1,800 | |

TENSILE STRENGTH

| | 3 | 4 |
|---|---|---|
| 15 | 1,360 | 1,900 |
| 30 | 1,950 | 2,000 |
| 45 | 2,350 | 2,130 |
| 60 | 2,225 | 2,260 |

PERCENT ELONGATION

| | 3 | 4 |
|---|---|---|
| 15 | 570 | 425 |
| 30 | 480 | 330 |
| 45 | 390 | 300 |
| 60 | 390 | 290 |

CRESCENT TEAR

| | 3 | 4 |
|---|---|---|
| 60 | 230 | 290 |

PHYSICALS AFTER AGING (48 HRS. AT 212° F.)

| | 3 | 4 |
|---|---|---|
| Tensile | 680 | 650 |
| Elongation percent | 120 | 165 |

The above shows the typical increase in hardness, tear resistance and modulus of the stock containing sulfurized tall oil, while maintaining satisfactory values in tensile and elongation. In Example 4 sulfurized tall oil replaces a relatively expensive plasticizer. Further to be noted is the better elongation value shown for Example 4 after aging.

Examples 5 and 6

The following formulations were used to produce a hose, unreinforced with fabric and the like, which would both retain its diameter within practical limits, and withstand severe flexing under pressure.

| | 5 | 6 |
|---|---|---|
| Neoprene Type GN | 80 | 80 |
| Neoprene Type W | 20 | 20 |
| Extra Light Calcined Magnesia | 6 | 6 |
| Stearic Acid | 2 | 2 |
| Neozone A | 2 | 2 |
| Heliozone | 3 | 3 |
| EPC | 50 | 50 |
| Barytes | 30 | 30 |
| Zinc Oxide | 5 | 5 |
| NA 22 | .5 | .5 |
| Circo Light Oil | 10 | 10 |
| Furatone 1444 | 15 | 10 |
| STO | | 10 |
| Total | 223.5 | 228.5 |

It will be noted that in Example 6 the sulfurized tall oil replaced 5 parts of the Furatone and extended the compound by 5 parts total.

These stocks were mixed on a conventional internal mixer, and after being sheeted on a roll mill were cured in the usual manner.

HARDNESS

| Cures (minutes) | 5 | 6 |
|---|---|---|
| 15 | 65 | 78 |
| 30 | 70 | 80 |
| 45 | 70 | 80 |
| 60 | 73 | 81 |

MODULUS AT 200%

| | 5 | 6 |
|---|---|---|
| 15 | 200 | 800 |
| 30 | 560 | 830 |
| 45 | 530 | 960 |
| 60 | 800 | 1,025 |

MODULUS AT 400%

| | 5 | 6 |
|---|---|---|
| 15 | 675 | 1,730 |
| 30 | 1,360 | 1,875 |
| 45 | 1,540 | 2,075 |
| 60 | 2,025 | 2,240 |

TENSILE STRENGTH

| | 5 | 6 |
|---|---|---|
| 15 | 1,340 | 2,040 |
| 30 | 1,900 | 2,075 |
| 45 | 1,950 | 2,200 |
| 60 | 2,200 | 2,330 |

PERCENT ELONGATION

| | 5 | 6 |
|---|---|---|
| 15 | 820 | 490 |
| 30 | 600 | 450 |
| 45 | 560 | 430 |
| 60 | 460 | 420 |

The above test results show that, in spite of the 5 part extension of the stock by sulfurized tall oil in Example #6, increases in hardness, modulus and tensile strength are obtained through all cures. At the same time there is a retention of good elongation in Example 6 in spite of the above.

Hoses were molded and flexing tests were carried out after aging the samples at 212° F. for 70 hours. One end of each sample hose was attached to a pipe held rigid, and the other end attached to a revolving plate with a 2 inch radius throw at a rate of 240 cycles per minute. 12 pounds per square inch water pressure was maintained throughout each test.

All samples tested other than those made from the stock of Example 6 failed between 70 and 90 hours. The samples made from the stock of Example 6 did not fail until after about 500 hours.

Examples 7 to 9

These examples illustrate the effect of tall oil sulfurized with lower percentages of sulfur, but otherwise prepared in a similar manner to the above sulfurized tall oils.

The base formula was the same as for Examples 5 and 6 except that:

Example 7 contained 10 parts of furatone 1444 and no STO.

Example 8 contained 10 parts furatone 1444 and 10 parts sulfurized tall oil (8% sulfur).

Example 9 contained sulfurized tall oil (6% sulfur).

The stocks in these examples were mixed on a conventional laboratory roll mill.

Examples 7 to 9—Continued

HARDNESS

| Cures | 7 | 8 | 9 |
|---|---|---|---|
| 15 | 73 | 77 | 76 |
| 30 | 75 | 78 | 80 |
| 45 | 75 | 80 | 80 |
| 60 | 75 | 80 | 80 |

MODULUS AT 200%

| | 7 | 8 | 9 |
|---|---|---|---|
| 15 | 675 | 700 | 650 |
| 30 | 900 | 860 | 875 |
| 45 | 975 | 940 | 1,000 |
| 60 | 1,060 | 1,000 | 1,050 |

MODULUS AT 400%

| | 7 | 8 | 9 |
|---|---|---|---|
| 15 | 1,800 | 1,575 | 1,560 |
| 30 | 2,225 | 2,000 | 2,150 |
| 45 | 2,400 | 2,250 | 2,330 |
| 60 | 2,560 | 2,360 | 2,350 |

TENSILE STRENGTH

| | 7 | 8 | 9 |
|---|---|---|---|
| 15 | 2,400 | 2,200 | 2,160 |
| 30 | 2,450 | 2,360 | 2,400 |
| 45 | 2,700 | 2,560 | 2,530 |
| 60 | 2,675 | 2,600 | 2,475 |

ELONGATION

| | 7 | 8 | 9 |
|---|---|---|---|
| 15 | 590 | 600 | 580 |
| 30 | 470 | 500 | 470 |
| 45 | 470 | 480 | 460 |
| 60 | 440 | 450 | 440 |

CRESCENT TEAR

| | 7 | 8 | 9 |
|---|---|---|---|
| 15 | 483 | 433 | 408 |
| 30 | 434 | 460 | 360 |
| 45 | 370 | 500 | 375 |

VISCOSITY AND SCORCH TESTS

| | 7 | 8 | 9 |
|---|---|---|---|
| ML 4 | 45½ | 30 | 29 |
| MS (Scorch) | 9 | 9 | 10 |

The Mooney viscosity values indicate much cooler mixes for Examples 8 and 9, which is of great advantage with neoprene stocks, which tend to set up during processing. The Mooney scorch values are comparable throughout, in spite of the considerably increased hardness of the stock containing sulfurized tall oil.

Examples 10 to 12

| | 10 | 11 | 12 |
|---|---|---|---|
| | Parts | Parts | Parts |
| Neoprene GN | 75 | 75 | 75 |
| Neoprene W | 25 | 25 | 25 |
| Extra Light Calcined Magnesia | 6 | 6 | 6 |
| EPC | 60 | 60 | 60 |
| Barytes | 50 | 50 | 50 |
| Stearic Acid | 2 | 2 | 2 |
| Neozone A | 1 | 1 | 1 |
| Permalux | .25 | .25 | .25 |
| Paraffin | 1 | 1 | 1 |
| Zinc Oxide | 4 | 4 | 4 |
| Carbonex S Plastic | 5 | 5 | |
| Cottonseed Fatty Acids | 5 | | 5 |
| STO | | 5 | 5 |
| Total | 234.25 | 234.25 | 234.25 |

Examples 10 to 12—Continued

HARDNESS

| Cures (minutes) | 10 | 11 | 12 |
|---|---|---|---|
| 15 | 68 | 76 | 76 |
| 30 | 71 | 80 | 80 |
| 45 | 75 | 80 | 80 |
| 60 | 75 | 80 | 81 |

MODULUS AT 200%

| | 10 | 11 | 12 |
|---|---|---|---|
| 15 | 430 | 975 | 760 |
| 30 | 800 | 1,100 | 1,130 |
| 45 | 1,200 | 1,160 | 1,250 |
| 60 | 1,300 | 1,250 | 1,400 |

MODULUS AT 400%

| | 10 | 11 | 12 |
|---|---|---|---|
| 15 | 1,060 | 2,075 | 1,740 |
| 30 | 1,800 | | |

TENSILE STRENGTH

| | 10 | 11 | 12 |
|---|---|---|---|
| 15 | 1,360 | 2,275 | 1,850 |
| 30 | 1,950 | 2,200 | 2,100 |
| 45 | 2,350 | 2,160 | 2,175 |
| 60 | 2,225 | 2,175 | 2,400 |

PERCENT ELONGATION

| | 10 | 11 | 12 |
|---|---|---|---|
| 15 | 570 | 450 | 440 |
| 30 | 480 | 370 | 370 |
| 45 | 390 | 360 | 330 |
| 60 | 390 | 360 | 320 |

The above series show that even 5 parts of sulfurized tall oil substitution for 5 parts of conventional plasticizer increases the hardness and modulus considerably, while the other values are substantially retained. Particularly to be noted are the evenness of the cures as exemplified by the tensile strength-time relationship of Examples 11 and 12 as compared with Example 10.

Examples 13 and 14

| | 13 | 14 |
|---|---|---|
| | Parts | Parts |
| Neoprene W | 100 | 100 |
| Neozone A | 2 | 2 |
| Petrolatum | 2 | 2 |
| Extra Light Calcined Magnesia | 4 | 4 |
| Medium Thermal Carbon Black | 30 | 30 |
| Neophax A | 15 | 15 |
| Dibutyl Phthalate | 10 | 10 |
| Zinc Oxide | 5 | 5 |
| NA 22 | .5 | .5 |
| Circo Light Oil | 10 | |
| STO | | 10 |
| Total | 178.5 | 178.5 |

HARDNESS

| Cures | 13 | 14 |
|---|---|---|
| 15 | 40 | 48 |
| 30 | 43 | 51 |
| 45 | 45 | 53 |
| 60 | 45 | 52 |

MODULUS AT 200%

| | 13 | 14 |
|---|---|---|
| 15 | 190 | 260 |
| 30 | 300 | 400 |
| 45 | 380 | 460 |
| 60 | 390 | 530 |

MODULUS AT 400%

| | 13 | 14 |
|---|---|---|
| 15 | 630 | 1,100 |
| 30 | 1,250 | 1,550 |
| 45 | 1,550 | 1,640 |
| 60 | 1,610 | 1,800 |

*Examples 13 and 14*—Continued

TENSILE STRENGTH

| Cures | 13 | 14 |
|---|---|---|
| 15 | 1,775 | 2,050 |
| 30 | 1,970 | 1,950 |
| 45 | 2,050 | 2,050 |
| 60 | 1,960 | 2,000 |

PERCENT ELONGATION

| | 13 | 14 |
|---|---|---|
| 15 | 720 | 640 |
| 30 | 530 | 500 |
| 45 | 450 | 500 |
| 60 | 425 | 460 |

The above is a soft neoprene extrusion stock suitable for sealing strips.

Apart from the generally better values in modulus and tensile strength, the increased elongation values for Example 14 are remarkable in view of the increased hardness and other increased values.

*Examples 15 to 17*

| | 15 | 16 | 17 |
|---|---|---|---|
| | Parts | Parts | Parts |
| Neoprene GN | 100 | 100 | 100 |
| Neozone A | 2 | 2 | 2 |
| Stearic Acid | 1 | 1 | 1 |
| Heliozone | 2 | 2 | 2 |
| Extra Light Calcined Magnesia | 4 | 4 | 4 |
| MT | 85 | 85 | 85 |
| EPC | 55 | 55 | 25 |
| Zinc Oxide | 5 | 5 | 5 |
| NA 22 | .5 | .5 | .5 |
| Circo Light Oil | 20 | | |
| STO | | 20 | 20 |
| Totals | 274.5 | 274.5 | 244.5 |

HARDNESS

| Cures (minutes) | 15 | 16 | 17 |
|---|---|---|---|
| 15 | 74 | 95 | 86 |
| 30 | 79 | 95 | 87 |
| 45 | 82 | 95 | 87 |
| 60 | 82 | 95 | 88 |

MODULUS AT 200%

| | 15 | 16 | 17 |
|---|---|---|---|
| 15 | 1,275 | | 1,500 |
| 30 | 1,850 | | 1,600 |
| 45 | | | 1,740 |

TENSILE STRENGTH

| | 15 | 16 | 17 |
|---|---|---|---|
| 15 | 1,750 | 1,660 | 1,760 |
| 30 | 1,950 | 1,600 | 1,760 |
| 45 | 1,900 | 1,525 | 1,740 |
| 60 | 1,800 | 1,450 | 1,650 |

PERCENT ELONGATION

| | 15 | 16 | 17 |
|---|---|---|---|
| 15 | 280 | 180 | 250 |
| 30 | 210 | 130 | 230 |
| 45 | 170 | 120 | 200 |
| 60 | 150 | 80 | 190 |

PERCENT RESILIENCE

| | 15 | 16 | 17 |
|---|---|---|---|
| 15 | 20.0 | 19.5 | 25.0 |
| 30 | 20.0 | 22.0 | 24.0 |
| 45 | 21.0 | 21.0 | 24.0 |
| 60 | 21.0 | 22.0 | 25.0 |

The above formulations are for a hard neoprene extrusion stock suitable for high pressure tubing.

Hardness and resilience are the most important requirements for such a stock. It should be noted that, in spite of the greatly increased hardness of Example 16 over the control, Example 15, the resilience values are slightly higher overall.

In Example 17 advantage has been taken of the reinforcing action of the sulfurized tall oil, as exemplified by the increased hardness, by cutting down on the filler used, the results in Example 17 showing appreciably greater resilience values throughout, and better elongations.

*Examples 18 to 20*

The following neoprene compound was mixed in an internal mixer:

| | Parts |
|---|---|
| Neoprene GN | 100 |
| Cumar CX | 10 |
| Extra light calcined magnesia | 4 |
| EPC | 37 |
| Whiting | 20 |
| Neozone A | 2 |
| Stearic acid | 1 |
| Heliozone | 1 |
| Altax | 1 |
| Sodium acetate | 1 |
| Thermoflex A | .5 |
| Circo light oil | 6.5 |
| Zinc oxide | 5 |
| Total | 189 |

Example 18 was tested as such. To the above mix, sulfurized tall oil was added (made as per Example 4) on a laboratory mill as follows: Example 19—5 parts of STO and Example 20—10 parts STO.

| | 18 | 19 | 20 |
|---|---|---|---|
| Relative Viscosity [1] | 17 | 14.5 | 14.5 |
| Mooney Scorch | 23½ | 22½ | 20½ |

[1] MS minimum reading @ 250° F. taken during Scorch test.

HARDNESS

| Cures (minutes) | 18 | 19 | 20 |
|---|---|---|---|
| 15 | 61 | 64 | 65 |
| 30 | 63 | 65 | 68 |
| 45 | 63 | 65 | 68 |
| 60 | 65 | 65 | 68 |

MODULUS AT 200%

| | 18 | 19 | 20 |
|---|---|---|---|
| 15 | 400 | 400 | 450 |
| 30 | 500 | 500 | 500 |
| 45 | 530 | 525 | 550 |
| 60 | 540 | 540 | 550 |

MODULUS AT 400%

| | 18 | 19 | 20 |
|---|---|---|---|
| 15 | 1,000 | 900 | 925 |
| 30 | 1,160 | 1,140 | 1,030 |
| 45 | 1,300 | 1,200 | 1,075 |
| 60 | 1,360 | 1,300 | 1,260 |

TENSILE

| | 18 | 19 | 20 |
|---|---|---|---|
| 15 | 1,750 | 1,700 | 1,650 |
| 30 | 1,800 | 1,760 | 1,700 |
| 45 | 1,900 | 1,840 | 1,700 |
| 60 | 1,940 | 1,860 | 1,760 |

PERCENT ELONGATION

| | 18 | 19 | 20 |
|---|---|---|---|
| 15 | 690 | 720 | 690 |
| 30 | 620 | 620 | 650 |
| 45 | 580 | 610 | 620 |
| 60 | 560 | 570 | 580 |

I claim:
1. A synthetic rubber composition adapted to be worked to a desired shape, said composition comprising a chloroprene rubber having an ML-4 viscosity at 212° F. in the range measurable by the Mooney method and the thermal reaction product of tall oil with from about 1 to 25% of sulfur based on the weight of the tall oil, the amount of said reaction product being from about 2 to 25% by weight of the chloroprene.

2. A synthetic rubber composition adapted to be worked to a desired shape, said composition comprising a chloroprene rubber having an ML-4 viscosity at 212° F. in the range measurable by the Mooney method and the thermal reaction product of tall oil with from about 6 to 10% of sulfur based on the weight of tall oil, the amount of said reaction product being from about 5 to 12% by weight of the chloroprene.

3. The composition of claim 1 in which there is also incorporated about 3 to 8% of extra light calcined magnesia based on the weight of the chloroprene rubbers present.

4. A synthetic rubber vulcanizate which comprises a polymerized chloroprene having an ML-4 viscosity at 212° F. in the range measurable by the Mooney method in admixture with the thermal reaction product of tall oil and sulfur, the sulfur in the reaction product being about 1 to 25% by weight based on the weight of the tall oil, and the amount of said reaction product being from about 2 to 25% by weight of the chloroprene rubber.

5. A method of preparing a rubber composition containing chloroprene rubber, which method comprises preparing a master batch of a chloroprene rubber having an ML-4 viscosity at 212° F. in the range measurable by the Mooney method, together with the thermal reaction product of tall oil with from about 1 to 25% of sulfur based on the weight of the tall oil, dispersing the master batch with an additional batch of rubber, and thereafter dispersing zinc oxide in the mixture.

References Cited in the file of this patent

UNITED STATES PATENTS 2,480,478  Kalman _____ Aug. 30, 1949

FOREIGN PATENTS 618,592  Germany _____ Sept. 11, 1935

OTHER REFERENCES

"Vinsol" Ad., Ind. Eng. Chem., 39, page 52A, November 1947.

Barron: "Modern Synthetic Rubbers," page 389, Chapman and Hall (1949).

Chemical Processing, page 27, vol. 16, No. 1 (January 1953).

U. S. Trademark Reg. No. 581,651, issued Dec. 27, 1953.